Sept. 15, 1953  T. VIGMOSTAD  2,652,096
SEAT STRUCTURE
Filed May 6, 1947  2 Sheets-Sheet 1
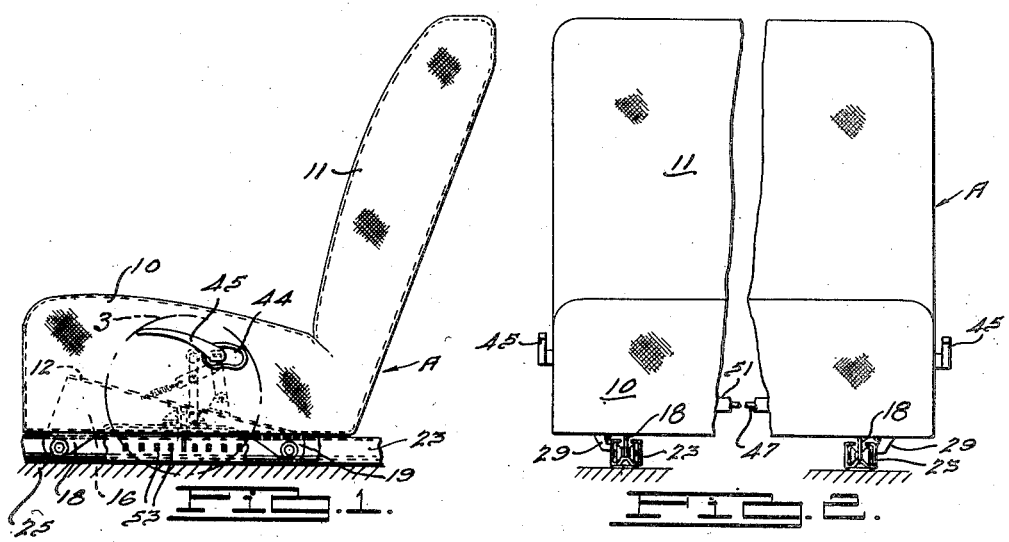
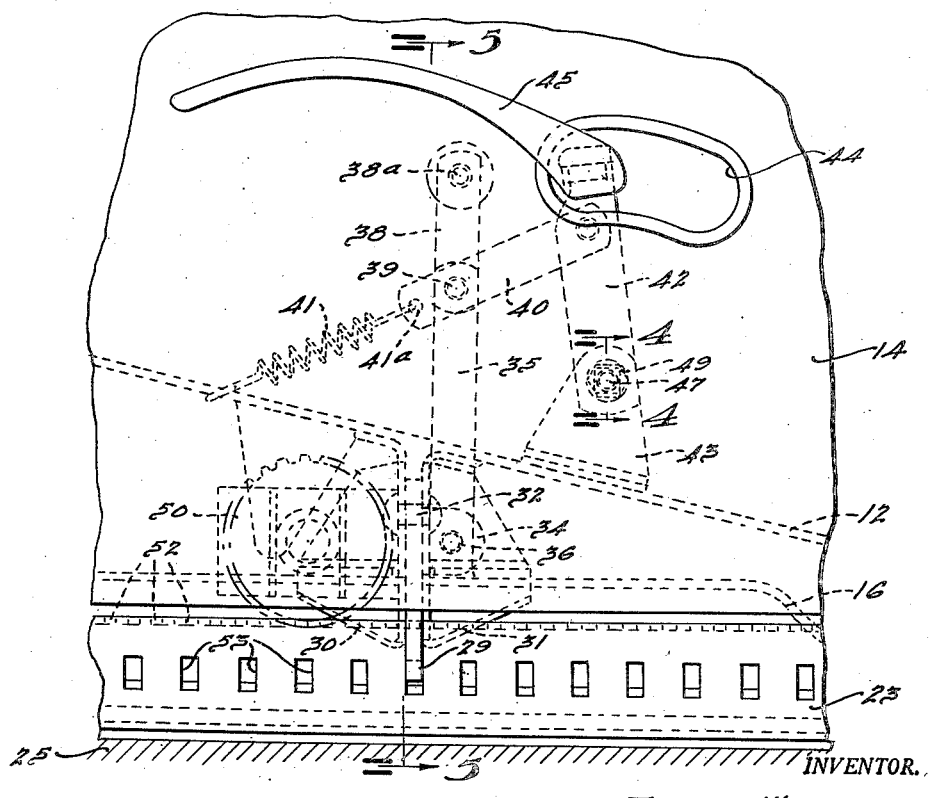
INVENTOR.
Trygve Vigmostad.
BY
ATTORNEY.

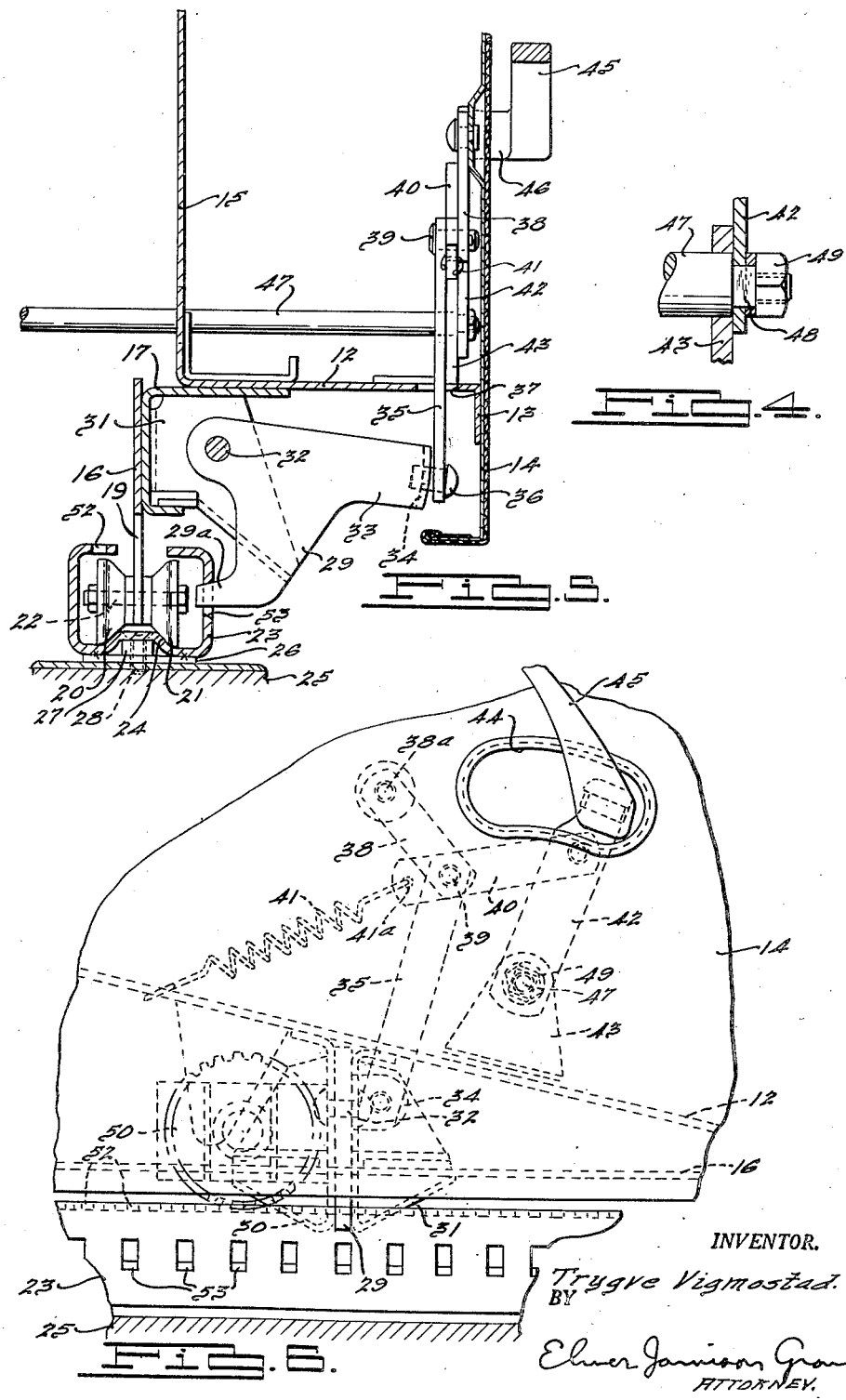

Patented Sept. 15, 1953

2,652,096

UNITED STATES PATENT OFFICE 2,652,096

SEAT STRUCTURE

Trygve Vigmostad, Detroit, Mich., assignor to Briggs Manufacturing Company, Detroit, Mich., a corporation of Michigan Application May 6, 1947, Serial No. 746,213

7 Claims. (Cl. 155—14)

The present invention relates to adjustable seats, relating more particularly to bodily movable seats, such as front seats for automobiles, which are adapted to be adjusted for the comfort and convenience of the occupants of a vehicle.

One of the objects of the present invention is the provision of an improved and simplified adjustable seat structure which, nevertheless, is durable and reliable in use as well as being easy and convenient to operate.

Another object of the invention resides in the provision of a vehicle seat, particularly a front seat for an automobile, which may be readily moved bodily longitudinally of the vehicle and wherein improved means is provided for securely locking the seat in a selected adjusted position and holding it against any tendency to rattle or chatter during operation of the vehicle.

It is another object of the invention to provide a seat structure which includes improved latching or locking mechanism as well as operating means therefor effective to hold or clamp the seat structure tightly to the supporting slide members for the seat. As a result of the improved construction the seat structure is substantially entirely freed from rattling due to play in the slide mechanism and, as a consequence, objectionable noises during operation of the vehicle are eliminated.

It is a somewhat more specific object of the invention to provide an adjustable seat structure having a spring controlled toggle joint operably connecting the operating handle of the locking mechanism with the detent or locking arm, which toggle joint is adapted not only to exert a comparatively large force to ensure positive operation of the detent but also to cause the detent to hold or clamp the seat to the supporting slides and prevent any relative movement therebetween.

In conventional sliding seat structures for vehicles, especially automobiles, it is customary to mount the seat on fixed supporting slide members, rollers or rolling elements being interposed between the seat and slide members to facilitate longitudinal adjustment of the seat. Since it is necessary to allow some play between the parts of the slide mechanism, there exists a tendency for the seat or parts thereof to rattle during vehicle operation, thus producing objectionable noises. Accordingly, one of the important objects of the invention is to construct the locking mechanism for the seat in such manner as to hold the seat tightly in position so as to eliminate rattling and objectionable noises during operation of the vehicle.

Other objects of the invention will appear in the following description and appended claims, reference being had to the accompanying drawings forming a part of this specification wherein like reference characters designate corresponding parts in the several views.

Fig. 1 is a side elevation of a seat structure constructed in accordance with the present invention.

Fig. 2 is a fragmentary front end elevation of the construction illustrated in Fig. 1.

Fig. 3 is an enlarged fragmentary side elevation of the structure included within the circle 3 in Fig. 1 and illustrating the parts in their latched or locked positions.

Fig. 4 is a detail section taken substantially through lines 4—4 of Fig. 3 looking in the direction of the arrows.

Fig. 5 is a cross-sectional view of the form of the invention illustrated, and is taken along the lines 5—5 of Fig. 3 in the direction of the arrows.

Fig. 6 is a view similar to Fig. 3 but shows the parts in their unlatched or unlocked positions.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, a seat structure constructed in accordance wtih the present invention. In the present instance the invention is applied to the front seat A of an automobile, this seat including a suitable frame having mounted thereupon a bottom cushion 10 and a back cushion 11. The frame and the cushions carried thereby may be of any suitable construction and the seat unit is supported on the floor of the vehicle body by a slide mechanism located beneath the seat at each side thereof. Since the construction of the slide mechanism is the same at each side of the seat, it will suffice to describe the structure at one side only.

The slide mechanism includes a rearwardly inclined bracket-like member 12 having a depending flange 13 (Fig. 5) which is welded or otherwise fastened to the inner face of the side wall 14 of the seat cushion 10. The bracket-like member 12 may also possess a generally upwardly extending flange 15 which is adapted to be secured to the seat unit. A generally vertically extending support plate 16 is connected to the bracket-like member 12 by means of an angle member 17 (Fig. 5), the later having an inclined upper flange adapted to fit against the underside of the member 12. The support 16 depends from the bracket 12 and terminates at its front and rear ends in downwardly extending generally rounded legs 18 and 19.

To each of the leg portions 18 and 19 there is attached a set of rollers 20 and 21 (Fig. 5). Each of these rollers is generally frusto-conical in shape, and the rollers are mounted in pairs, one of each pair being located on opposite sides of the support 16 in alignment. They are held in this position by a bolt 22 which acts as an axle. It will be understood that rollers similar in construction to the rollers 20 and 21 are located at both of the front and back leg portions of each of the supports 16.

Each set of rollers 20, 21 operates within a generally channel-shaped supporting slide or track member 23. The bottom web of the track member 23 is embossed or pressed upwardly to form a ride 24 (Fig. 5) with which the rollers 20 and 21 have rolling engagement. The track member 23 is secured to the floor 25 of the vehicle by a plate 26 and spacer 27, the track member being welded to the plate, and a bolt 28 being employed to hold the track and spacer rigidly to the floor. It will be understood that a track member 23, together with its securing elements, is located at each side of the structure as shown in Fig. 2.

The means for latching or locking the seat unit A in an adjusted position includes a locking arm or detent 29 which lies between a pair of supporting brackets 30 and 31 and is pivoted thereto by means of a pin or stud 32. The supporting brackets 30 and 31 are secured to the inner walls of the angle member 17 (Fig. 5), and are provided with parallel web portions adapted to lie contiguous with and to support the detent 29. The detent terminates in a wedge-shaped detent portion 29a engageable within any one of a series of openings or holes 53 in the side wall of the supporting slide member 23.

The detent 29 is provided with an outwardly extending projection 33 which terminates in a generally rearwardly extending flange 34. A link 35 is pivoted at its lower end to the flange 34 by means of a rivet 36. The link 35 extends upwardly through an opening 37 in the bracket member 12 and is pivoted at its upper end by means of a pivot pin 39 to a second link 38. The latter is pivoted at its upper end at 38a to an embossment pressed from the side wall 14 of the seat 10 (Fig. 5). It will be seen that the links 35 and 38 comprise a toggle joint of which the pivot pin 39 is the knee. Pivotally attached at 39 to the toggle joint 35, 38 is a connecting or operating link 40. The forward end of the connecting link 40 extends beyond the toggle joint and one end of a spiral tension spring 41 is secured thereto at 41a. The opposite end of this spring is anchored to the bracket member 12.

The rear end of the connecting link 40 is pivotally attached to an operating arm 42 near the upper end of the latter. The operating arm 42 is pivotally connected at its lower end to the upstanding ear portion of a bracket 43 which is rigidly fastened to the upper surface of the bracket member 12. The upper end of the operating arm 42 terminates at the inner side of a generally elliptical opening 44 in the side wall 14.

An operating handle 45 is provided with a projecting portion extending through the opening 44 and firmly attached to the upper end of the arm 42.

Since the seat structure is provided with a seat supporting assembly and tracks at both sides it is also provided with latching mechanism at both sides (Fig. 2). These mechanisms are identical in construction and are operably connected by means of a transversely extending rod 47 which is secured to the operating links 42 and rotates within apertures in the brackets 43. The rod has a reduced portion 48 at each end extending through a hole in the link 42 and clamped to the link by a nut 49 (Fig. 4). The reference numeral 50 designates a generally vertically positioned gear or toothed wheel having teeth meshing in longitudinally spaced aligned apertures, some of which are shown at 52, in the inner upper flange of the track member 23 (Figs. 3 and 6). A wheel or gear 50 is located at each side of the seat structure and these wheels are preferably held in place by means of a transversely extending rod 51 (Fig. 2), piercing and suitably mounted on the supports 16 at opposite sides of the seat A.

In view of the foregoing description, it will be understood that the seat unit A may be moved fore and aft, that is, longitudinally of the vehicle, since it is supported by laterally spaced rollers at the front and back. The seat unit is guided by the tracks while so moving. In order to position the seat in a selected location, an occupant may grasp the operating handle 45 at either side and move it rearwardly, that is, from its forward postion shown in Fig. 3 to its rearward position shown in Fig. 6. Such movement of the handle 45 will swing the operating arm 42 about its pivot, thus breaking the toggle joint 35, 38 through the medium of the connecting link 40. As a result, the spring 41 is stretched and tensioned, and the link 35 is moved upwardly. Such movement of the link 35 will swing the detent 29 about its pivot 32 and will withdraw the wedge-shaped tooth-like portion 29a of the detent from one of the aligned openings 53 in the track 23. Swinging movement of the operating link 42 will also rotate the rod 47 so that the latching mechanisms on both sides of the seat structure are operated no matter which handle 45 is moved. Consequently, the seat unit A is unlatched or released and is free to be moved to its selected position.

When the seat A is in its selected position, the occupant of the vehicle may release the handle 45 whereupon the spring 41 will contract to straighten the toggle joint 35, 38 returning the handle to its forward position. Such straightening of the toggle joint 35, 38 will swing the detent 29 downwardly and force the tooth 29a within one of the openings 53 within the track 23. If the tooth 29a is not aligned with an opening in the track, the seat unit A may be moved slightly forwardly or backwardly until such alignment is attained.

It will be noted that during rotation of the gears 50 the teeth thereof mesh in the aligned openings 52 in the top flange of the track 23 as the seat is moved. The purpose of these gears is to maintain the seat A in alignment and, in particular, to prevent one side of the seat from moving forwardly or backwardly relative to the other side. It will also be noted that the upper edges of the openings 53 in the track 23 as well as the upper edge of the detent tooth 29a possess inclined edges so that the tooth not only tightly engages the track when in its latching position but also by its wedging action clamps the seat to the fixed track 23 and prevents any vertical vibratory motion of the rollers 21 within the track during vehicle operation. Also, the link 35 is pivotally connected to the detent 29 by means of the somewhat inclined pivot pin or rivet 36 which tends to tightly hold the detent 29 and its operating link 35 together. However, this pivotal connection is workable since the terminating flange 34 of the detent is slightly arcuate in shape (Fig. 5), thus permitting the link 35 to be raised and lowered for swinging the detent into and out of its latching position. However, when in its latching position the parts of the pivotal connection between the detent 29 and the link 35 are tightly held together.

I claim:

1. In a seat structure for a vehicle body, a seat supporting track, a seat unit movable along said track, latching means cooperating with said track for releasably securing the seat unit in a selected position, operating means for said latching means, a pivot pin pivotally connecting said operating means and latching means, said pivot pin being rigidly secured to one of said means and extending angularly into a pivot hole in the other means and cramped by the latter means when the pivotally connected latch and operating means are in latched position.

2. In a vehicle body, a seat supporting track secured to the body, a seat structure adjustably movable along the track, fixed means integral with the track and spaced longitudinally thereof, a pivotal member having a cam projection and mounted on the seat structure for swinging the cam projection into engagement with said fixed means to push upward thereon, and operative means engaged with the pivotal member for pivoting thereof including toggle means pivotally connected at opposite ends to the seat structure and to said pivotal member, the toggle means being disposed to swing the cam projection into engagement with the fixed means upon being straightened.

3. In a vehicle body, a seat supporting track secured to the body, a seat structure adjustably movable along the track, fixed means carried by the body and spaced longitudinally of the track, means pivotally mounted on the seat structure for locking the latter against movement along the track and for drawing the seat structure downward, the last named means having a cam projection and being mounted to swing the upper edge of the cam projection into engagement with the fixed means below a portion of the latter to push upward thereon, operative means engaged with the pivotal member for pivoting thereof including toggle means pivotally connected at opposite ends to the seat structure and to said pivotal member, the toggle means being disposed to swing the cam projection into engagement with the fixed means upon being straightened, and resilient means urging the toggle means to the straightened position.

4. In a vehicle body, seat supporting track members secured to the body and having a plurality of longitudinally spaced openings therein, a seat structure adjustably movable along said track members, a pivotal lever having a locking projection selectively insertible into each of said openings, said lever being mounted on the seat structure for pivoting said projection into said openings, the upper edge of said projection being engageable with the upper edges of said openings to push upward thereon.

5. In a vehicle body, seat supporting track members secured to the body and having a plurality of longitudinally spaced openings therein, a seat structure adjustably movable along said track members, a pivotal lever having a locking projection selectively insertible into each of said openings, said lever being mounted on the seat structure for pivoting said projection into said openings, the upper edge of said projection comprising a cam surface and being engageable with the upper edges of said openings to push upward thereon, toggle means pivotally connected at its opposite ends to the seat structure and to said lever for operation of the latter, said toggle means being disposed to force the locking projection into or out of locking engagement with the track members upon straightening or flexing respectively of the toggle joint, and resilient means urging the toggle means to the straightened position.

6. In a vehicle body, seat supporting track members secured to the body and having a plurality of longitudinally spaced openings therein, a seat structure adjustably movable along the track members, a pivotal lever mounted on the seat structure for pivoting about an axis generally parallel to the track members and having a locking projection insertible into any of said openings upon said pivoting, the upper edge of said projection being engageable with the upper edges of said openings to push upward thereon, and operating means engaged with the lever for pivoting the same.

7. In a seat structure for a vehicle body, seat supporting track means, a seat unit movable along said track means, latching means cooperative with said track means for releasably latching the seat unit in a selected position, operating means for said latching means, and a pivot pin pivotally connecting said operating and latching means, said pin extending from said latching means into an aperture in said operating means and being cramped by the latter when said latching means is disposed in latched position with respect to said track means.

TRYGVE VIGMOSTAD.

References Cited in the file of this patent

UNITED STATES PATENTS

| Number | Name | Date |
|---|---|---|
| 1,118,768 | Helgeson | Nov. 24, 1914 |
| 1,214,071 | Rasmus | Jan. 30, 1917 |
| 1,735,518 | Van Valkenburg et al. | Nov. 12, 1929 |
| 1,964,405 | Nenne | June 26, 1934 |
| 2,102,226 | Saunders | Dec. 14, 1937 |
| 2,195,349 | Woina | Mar. 26, 1940 |
| 2,336,433 | Woina | Dec. 7, 1943 |
| 2,469,113 | Hooker | May 3, 1949 |

FOREIGN PATENTS

| Number | Country | Date |
|---|---|---|
| 622,197 | Germany | Nov. 22, 1935 |
| 701,049 | Germany | Jan. 7, 1941 |
| 23,621 | Great Britain | 1909 |
| 206,332 | Great Britain | Nov. 8, 1923 |